United States Patent [19]

Nakagiri et al.

[11] 4,149,257
[45] Apr. 10, 1979

[54] ALARM WATCH EQUIPPED WITH ELECTRONIC CALCULATOR

[75] Inventors: Tadahiko Nakagiri, Higashimurayama; Matao Nezu, Hino; Toshiaki Oguchi, Kodaira; Toshikazu Hatuse, Tanashi; Minoru Natori, Nishitama, all of Japan

[73] Assignee: Citizen Watch Company Limited, Tokyo, Japan

[21] Appl. No.: 801,939

[22] Filed: May 31, 1977

[30] Foreign Application Priority Data

| Jun. 15, 1976 | [JP] | Japan | 51-69364 |
| Jun. 21, 1976 | [JP] | Japan | 51-73008 |
| Jun. 21, 1976 | [JP] | Japan | 51-73009 |
| Jun. 21, 1976 | [JP] | Japan | 51-73010 |
| Jun. 21, 1976 | [JP] | Japan | 51-73011 |
| Jun. 21, 1976 | [JP] | Japan | 51-73017 |
| Jun. 21, 1976 | [JP] | Japan | 51-73018 |

[51] Int. Cl.² ........................ G04C 23/00; G06F 7/38
[52] U.S. Cl. .................................. 364/705; 58/57.5; 340/384 E; 364/708; 364/712
[58] Field of Search ........................ 364/705, 707; 340/324 R, 220; 58/50 R, 23 BA, 23 A, 23 AC, 57.5, 152 B; 320/2, 15, 16; 302/200 R, 43, 71; 350/160 LC

[56] References Cited

U.S. PATENT DOCUMENTS

| 3,813,533 | 5/1974 | Cone et al. | 58/50 R |
| 3,941,989 | 3/1976 | McLaughlin et al. | 340/324 R |
| 3,955,355 | 5/1976 | Luce | 58/50 R |
| 3,968,641 | 7/1976 | Moyer | 58/50 R |
| 3,984,176 | 10/1976 | Hirai et al. | 350/160 LC |
| 3,994,568 | 11/1976 | King et al. | 350/160 LC |
| 4,015,420 | 4/1977 | Walker | 58/50 R |
| 4,017,155 | 4/1977 | Yagi et al. | 350/160 LC |
| 4,022,014 | 5/1977 | Lowdenslager | 364/705 |
| 4,026,103 | 5/1977 | Ichikawa et al. | 350/160 LC |

*Primary Examiner*—Charles E. Atkinson
*Assistant Examiner*—Errol A. Krass
*Attorney, Agent, or Firm*—Frank J. Jordan

[57] ABSTRACT

An electronic alarm watch having an external operation device, which comprises a timekeeping section and an electronic calculator. The timekeeping section is composed of a quartz crystal oscillator connected to a first battery and providing a relatively high frequency signal to provide a low frequency signal, a counter circuit responsive to the low frequency signal to provide time information signals, a driver circuit providing driving signals in response to the time information signals, a time display section in response to the driving signals, an alarm time detection circuit connected to the counter circuit to detect an alarm time set by the external operation device, and an acoustic device responsive to an output from the alarm time detection circuit to generate a sound indicative of the alarm time. The electronic calculator is composed of a calculating section connected to the external operation device to perform calculation in response to input signals delivered from the external operation device, a calculator display section, and a booster circuit connected to second batteries to supply boosted output voltage to the calculating section and the calculator display section.

4 Claims, 6 Drawing Figures

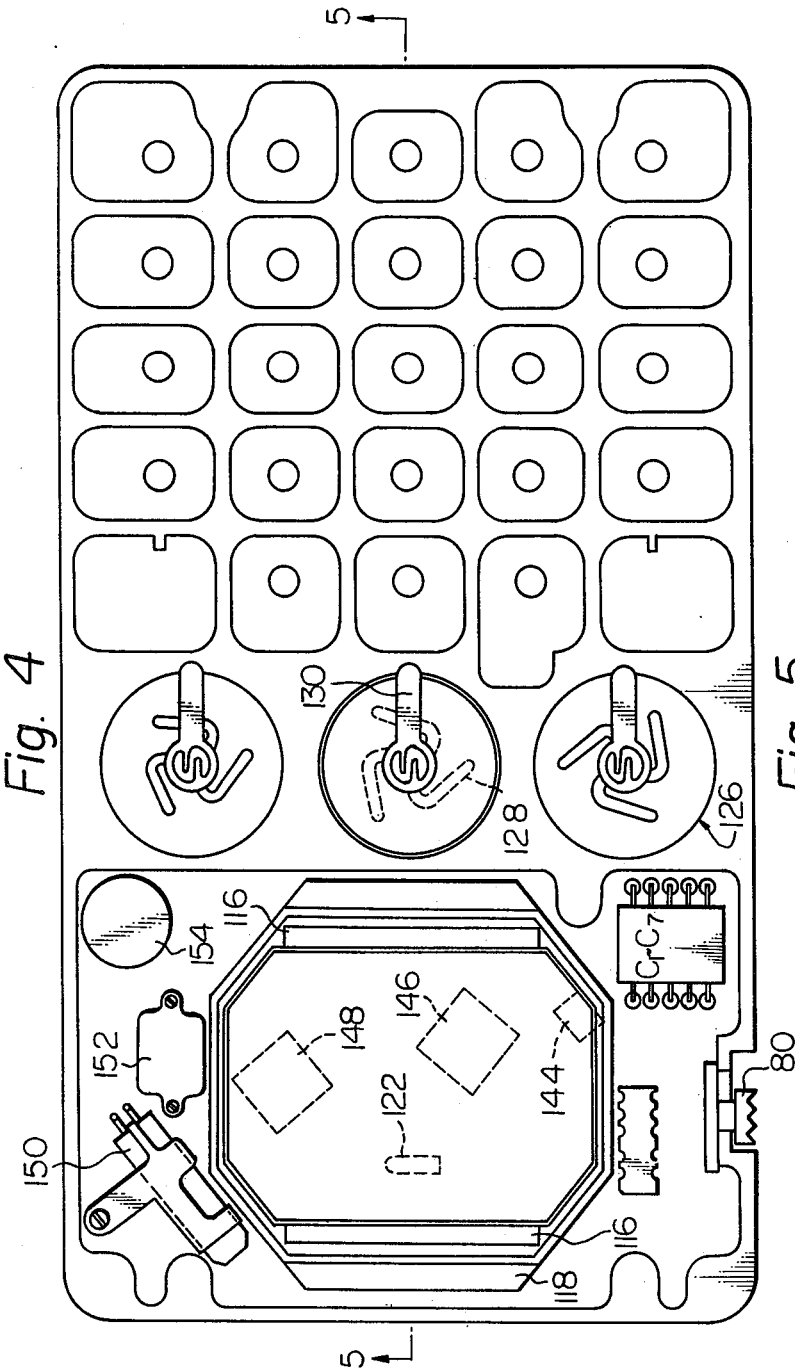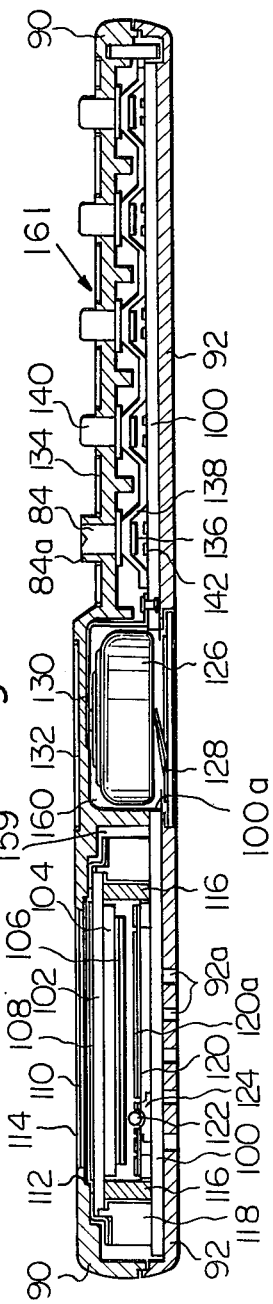

ALARM WATCH EQUIPPED WITH ELECTRONIC CALCULATOR

This invention relates to an alarm watch equipped with an electronic calculator.

In recent years much progress has been made in the development of wristwatches which display time in a digital manner through the utilization of electro-optical display devices such as liquid crystals, LEDs, or electro-chromic substances. In addition, the growth of IC technology has made it possible to realize extremely slender, multifunction wristwatches which have a sufficiently long battery life. For example, digital wristwatches of the crystal controlled oscillator type utilizing liquid crystal display elements have already been developed and normally can be expected to operate for two years on a single battery. Progress in the field of ICs has also promoted the development of electronic calculators and they too have been greatly reduced in size, furnished with a number of functions and have come to make use of such low power display devices as liquid crystals.

The present invention seeks to combine and accommodate within the same case an electronic calculator as well as a digital timepiece, and more particularly seeks to provide a portable watch equipped with an electronic calculator and having a built-in alarm mechanism, with the same display device being used to display both time and the results of calculations.

In the accompanying drawings, in which:

FIG. 4 is a plan view showing the essential part of the calculator shown in FIG. 3A; and FIG. 5 is a cross sectional view taken on line 5—5 of FIG. 4.

Figure 1:
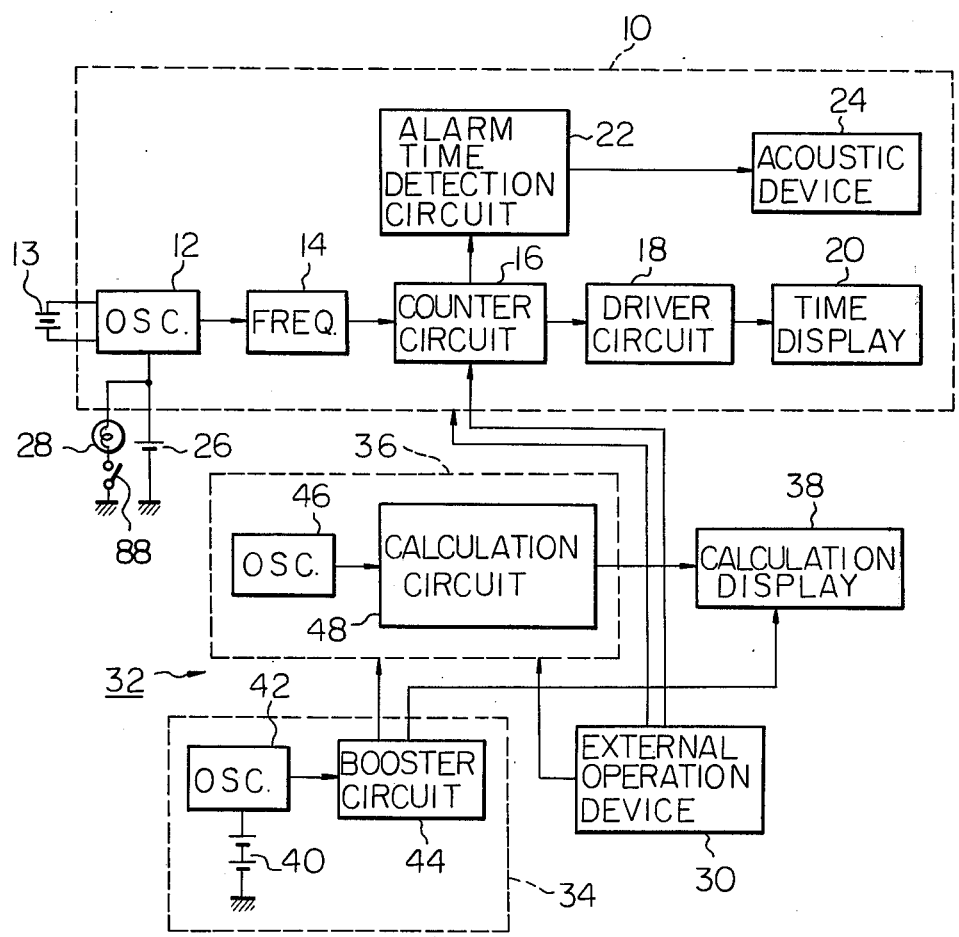
FIG. 1 is a block diagram of a watch system equipped with an electronic calculator and including an alarm mechanism in accordance with the present invention.

Referring to FIG. 1, there is shown a block diagram of a watch system equipped with an electronic calculator and including an alarm mechanism in accordance with the invention. Reference numeral 10 denotes a timekeeping section in simplified form having an alarm mechanism and which includes an oscillator 12 controlled by quartz crystal 13 to provide a relatively high frequency signal, frequency divider 14 dividing down the high frequency signal to provide a low frequency signal, counter circuit 16 responsive to the low frequency signal to produce various time information signals such as seconds, minutes, hours, days of the week and months signals, driver circuit 18 providing various drive signals in response to the time information signals, and time display section 20 to display time data in response to the drive signals. Alarm time detection circuit 22 is connected to counter circuit 16 and detects alarm time set by external operation device or keyboard 30 to provide alarm time signal, by which acoustic device 24 is energized. Indicated as 26 is a battery and 28 is a lamp for the display section 20. The electronic calculator, generally designated as 32, includes a power source 34, a calculating section 36 connected to the key board 30 composed of numeric and function keys, and a calculator display section 38. Power source 34 is comprised of a battery 40, oscillator 42 for boosting voltage, and booster circuit 44. The calculating section 36 includes an oscillator 46 providing clock pulses for calculation, and a calculation circuit 48.

As stated hereinbefore, the present invention relates to a compact alarm watch having an electronic calculator, one feature of which is an improved power source 34. Electronic timepieces and calculators which make use of liquid crystal display devices are characterized by the fact that they consume little power. This is especially true with regard to the timekeeping section of a watch which demands little voltage and power, a feature that assures a power source lifetime of approximately two years. However, the stability of calculation circuits and the speed required for calculations in the calculator section of a watch demand a higher voltage and necessitate a greater consumption of power than the timekeeping section. Moreover, unlike the timekeeping section which employs a static method of driving, the electronic calculator section makes use of a matrix driving method since the number of terminal leads for the display device are reduced to as great an extent as possible. A matrix driving method requires at least two batteries which, because of the limited space within the watch case, cannot be connected in series. This necessitates the utilization of a booster circuit.

Figure 2:
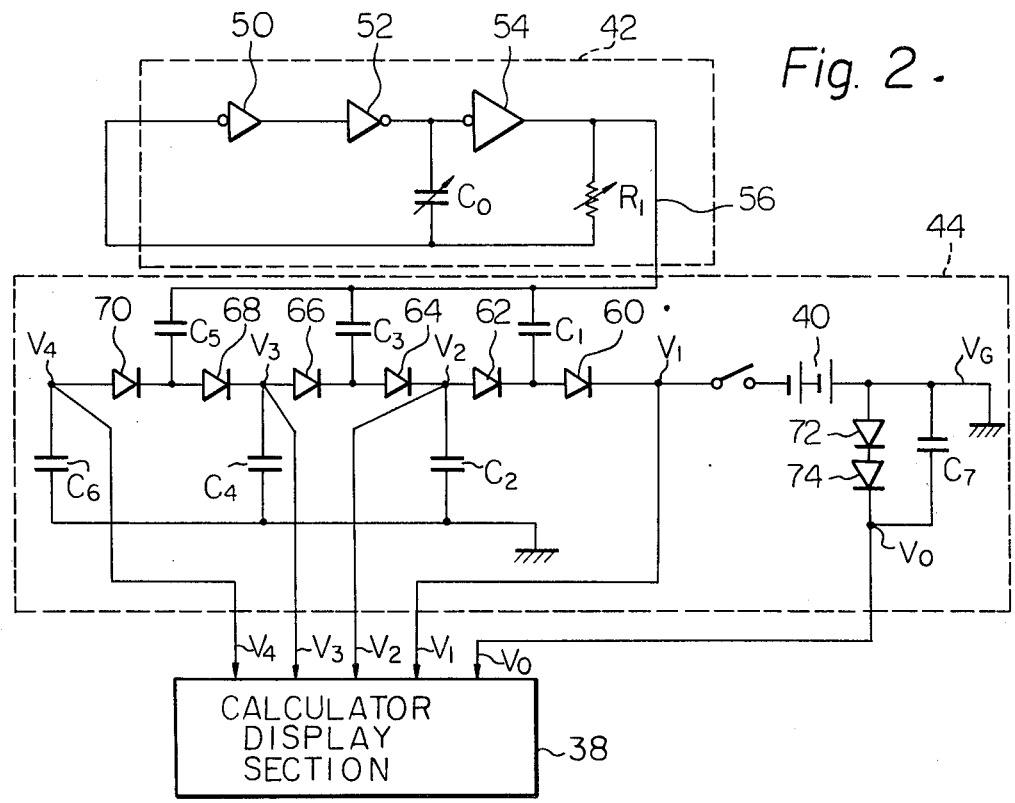
FIG. 2 is a detailed circuitry for a booster circuit used in the electronic calculator shown in FIG. 1.

FIG. 2 is a preferred example of a booster circuit employed in the power source 34 shown in FIG. 1. Oscillator 42 includes inverting amplifiers 50, 52 and 54 connected in series, and variable capacitor $C_0$ and variable resistor $R_1$ connected in parallel with the outputs of inverting amplifiers 52 and 54 to regulate the output oscillating frequency for thereby adjusting the output voltage of the booster circuit 44. With this arrangement, the oscillator 42 applies an AC current to booster circuit 44. An approximately 300 Hz clock or input signal produced by the oscillator is amplified and shaped by the inverters 50, 52, inverted by the inverter 54 and appears as a rectangular wave output signal on output line 56 which applies the signal to booster circuit 44. The inverting amplifiers 50, 52, 54 are of C-MOS (complementary metal oxide semiconductor) type and, by shaping the rectangular wave, reduce by as much as possible the electrical power which flows through the circuit during the switching of the output inverting amplifier 54. Furthermore, when the threshold voltage Vth of the C-MOS transistor of inverter-amplifier 54 is set close to the power source voltage, the current flow is reduced to a very low level during the switching of the C-MOS transistor even if the input to the inverter has a sine wave component. Therefore, there will be almost no wasteful consumption of power within inverter-amplifier 46 if the threshold voltage of the inverter-amplifier is set to at least to a value between 80% of the power source voltage and the power source voltage itself. Accordingly, if oscillator 42 makes use of an independent C-MOS chip which is provided independently from the IC chip of the calculator, and if a threshold voltage Vth set close to the voltage of power supply 40 is employed, power consumption can be reduced in a manner as previously noted.

The booster circuit 44 includes a Cockcroft circuit connected to the negative terminal of power supply 40 and composed of a plurality of pairs of booster diodes 60 through 70 connected in series and capacitors C1 through C6 connected in parallel with the diodes 60 through 70, respectively, in order to provide a plurality of output voltages V1, V2, V3 and V4 in response to clock pulses. Assuming that the output voltage of the power supply 40 is 3V, the voltages V1, V2, V3 and V4 have potential levels of −3V, −4.6V, −6.3V and −8.3V, respectively. The voltages Vo, V1, V2, V3 and V4 are applied to a display driver (not shown) of the display device 30, which is driven in a matrix driving mode. Now, assuming that the voltage V2 is a reference voltage, the potential difference between the voltage V2 and each of the voltages VG, V1, V3 and V4 is expressed as:

$|V3-V2| = |6.3-4.6| = 1.7$ $|V4-V2| = |8.3-4.6| = 3.74$ $|V1-V2| = |4.6-3\ \ | = 1.6$ $|VG-V2| = |0\ \ -4.6| = 4.6$

From the above equations it will be seen that there exists a significant difference in potential level between the absolute value of V4−V2 and that of VG−V2. This potential difference will cause a DC component in the matrix driving, so that deterioration of liquid crystals will be caused. To prevent this drawback, the present invention features the provision of voltage compensating elements such as diodes 72 and 74 connected in series with the positive terminal of the power supply 40. The diodes 72 and 74 serve as voltage dropping diodes but may be replaced by resistors or by other semi-conductors such as transistors or thermistors serving to compensate for changes in ambient temperature. A capacitor C7 is connected in parallel with the diodes 72 and 74; the voltage across the capacitor C7 is designated by Vo. The voltage drop which occurs across each of the diodes 72 and 74 due to the current flow therethrough compensates for respective potentials at each booster stage; the voltages Vo, V1, V2, V3 and V4 having the potential levels of 0, −2.0, −3.6, −5.3 and −7.3, respectively. In this case, the potential differences between the voltage V2 and each of the voltages V0, V1, V3 and V4 will be 3.6, 1.6, 1.7 and 3.7. In such a case, since the voltage differences between V2 and each of the potentials Vo, V1, V3 and V4 are symmetrical, there is almost no DC component so that wasteful power consumption and deterioration of liquid crystals can be prevented. This is particularly advantageous in a case where the liquid crystal display is driven in a matrix mode.

Figures 3A, 3B:
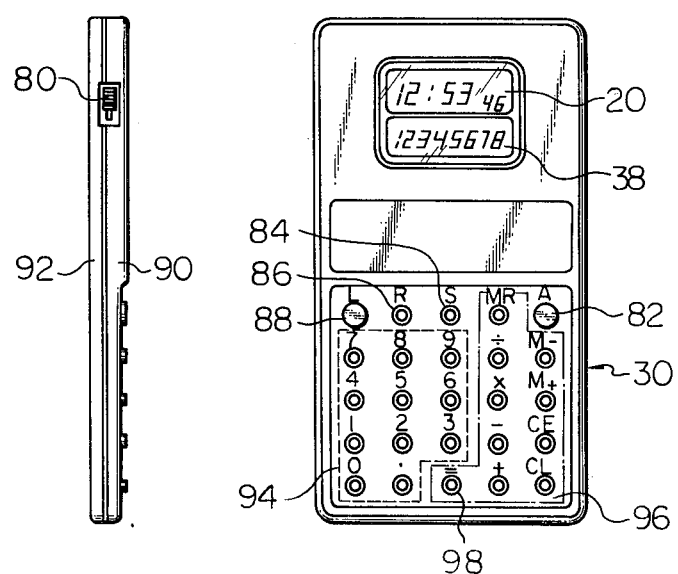
FIG. 3A is a front view of an electronic calculator watch in accordance with the present invention.
FIG. 3B is a side view of the calculator shown in FIG. 3A.

FIG. 3A is an external view of a compact alarm watch equipped with an electronic calculator in accordance with the invention. Reference numeral 20 denotes a time display section, 38 a calculator display section, 30 a keyboard which serves as an external operation device, 80 a power supply switch for the calculator, 82 an alarm setting switch, 84 a digit selection switch for time corrections, 86 a time correction switch, 88 an illumination switch, 90 the upper portion of the case, and 92 the lower portion thereof. Only the time display is continuously in use and, in the drawing, indicates a time of 12:53:46.

When it is desired to effect a time correction, digit selection switch 84 is depressed so that the seconds digit is illuminated, thereby indicating that it has been brought to the state for a correction. Depressing the button for a second time shifts the digit for correction to the minutes digit which is thus illuminated to indicate this state. Depressing the button a third time similarly shifts the digit for correction from the minutes to the hours digit which is illuminated to indicate that it has been brought to a state for correction. Once the seconds, minutes or hours digit has been selected by the above-described operation, a time correction is performed by depressing correction switch 86 each single depression of which advances by one unit the number appearing in the selected location. The time display is restored to normal operation by depressing selection switch 84 while the hours digit is in the state for a correction.

In order to set and correct the alarm, time correction switch 86, which also serves as an alarm timing access switch, is depressed, whereupon a symbol indicative of alarm timing is displayed along with the alarm timing. In this state, depressing alarm setting switch 82 first illuminates the hours digit of the alarm timing display to indicate that the digit is in the state for a correction. Depressing time correction switch 86 allows the hours digit to be advanced at one unit increments. The minutes digit is corrected in a similar fashion, i.e., after the minutes digit has been selected by depressing alarm setting switch 82, time correction switch 86, is depressed to advance the digit at one unit intervals. Depressing alarm setting switch 82 once again displays the alarm timing. When time correction switch 86 is depressed, the alarm timing is memorized, the display vanishes and the normal time display is restored. When the built-in alarm detection circuit 22 (see FIG. 1) detects coincidence between the time and the alarm setting, acoustic device 24 is activated and sounds an alarm. The alarm is turned off by depressing alarm setting switch 82.

The illumination switch 88 is depressed to illuminate the time display so that it can be read in a darkened area.

Calculator keyboard 30 consists of numeric keys 94 and function keys 96. The MR key which is one of the function keys is a switch for extracting the content stored in the memory circuit of calculator circuit 48; when the key is depressed a second time, the stored content is erased. The M+ and M− keys store information in the memory circuit and also perform the same function as EQUAL key 98. By way of example, if the M+ is depressed following a 5×5 operation, 25 is displayed along with a memory sign M while the product 25 is simultaneously recorded in the memory circuit. Next, if the M+ key is depressed following a 2×5 operation, the product 10 is displayed. If the MR key is then depressed, 10 is added to the product 25 of the previous operation and the result 35 is displayed. In this fashion it is possible to add the results of any number of operations. The M− key functions in a reverse manner, thereby allowing the results of operations to be subtracted.

FIG. 4 is a plan view showing the construction of an alarm watch equipped with a calculator in accordance with the invention, and FIG. 5 is a cross-sectional view of FIG. 4B. In FIG. 4, the upper case 90 has a first recessed portion 159, a second recessed portion 160 serving as a battery accommodating portion and a third portion serving as a keyboard, with the first, second and third portions being arranged in order in a longitudinal direction of the upper case. Reference numeral 100 denotes a printed circuit board having a first region carrying thereon a timekeeping integrated circuit chip 148 and a calculator integrated circuit chip 146, a second region formed with a bore 100a for allowing replacement of batteries 126, and a third region provided with a plurality of switch contacts 142 adapted to be selectively closed by keys to provide numeric signals and function signals to be applied to the calculator integrated circuit chip, 102 an upper glass plate for the display, 104 a lower glass plate for the display, 106 a lower polarizing plate, 108 an upper polarizing plate, 110 a filter, 112 a partitioning plate, 114 a cover glass, 116 electrically conductive members, 118 a cell supporting frame, 120 a vibrating plate for stacking piezoelectric elements 120a, 92a openings formed in the lower case 92 and adapted to diffuse the sound of the alarm, 122 a lamp, 124 a lamp supporting platform, 128 a battery keep spring, 130 a battery retention spring, 132 a decorative panel, 134 a nameplate for indicating the function of the keys, 84 a time correction key, 136 a piece of electrically conductive rubber, 138 an elastomeric member made of rubber or the like and serving as a restoring spring, 140 a calculation key, 142 an electrode pattern, 80 a calculator power switch, C1 through C7 booster capacitors, R1 an oscillator resistor, 144 a booster IC, 150 a crystal controlled oscillator, 152 a trimmer condenser, and 154 an alarm booster coil. As can be appreciated from the drawings, the alarm watch may be broadly classified into the following categories: the upper case 90, lower case 92, printed circuit board 100, liquid crystal display device 104, battery accommodating portion 160, and calculator key group 140. The keys are disposed such that their respective uppermost surfaces do not project beyond the uppermost surface of the display section. Instead of the keys themselves bearing a number or character, the nameplate is provided with the appropriate information by a printing or engraving process and possesses a varied design. For the calculator power source switch a slide switch is adopted and installed so as not to protrude from the side of the case in order to maintain a slim design. This construction also prevents accidental operation of the switch and thus does not require a locking mechanism. Since the power switch is located at the left side of the case the calculator can be held in one held and turned ON and OFF by manipulating the switch with the ball of the thumb or the thumb-nail. Finally, in order to prevent the inadvertent operation of time correction switch 84, a collar 84a is provided about its outer periphery thereby to prevent its accidental operation. The lamp supporting platform 124 is mounted on the printed circuit board and composed of a reflection plate and a deflection plate secured to each other. The reflection plate is made of any suitable material such as plastic sheet or styrene sheet. The reflection plate may be formed with a layer of irregular reflection surface. The vibrating plate 120 of the acoustic device is supported on the supporting frame, which is secured to the printed circuit board whereby vibrations produced by the acoustic device are amplified by the printed circuit board through an intermediary of the cell supporting frame and the case is subjected to resonance to increase the level of alarm sound. The piezoelectric element 120a mounted on the vibrating plate 120 may be provided with an irregular surface by which an illumination effect of the lamp is increased.

What is claimed is:

1. In an electronic calculator watch powered by a plurality of batteries and having a timekeeping integrated circuit chip adapted to provide a first display information signal representative of time information, a calculator integrated circuit chip adapted to provide a second display information signal representative of calculation result being performed in response to numeric signals and function signals applied by a keyboard, and an alarm time detection circuit incorporated in the timekeeping circuit, the improvement comprising:

an upper case including a first recessed portion formed with an opening, a second recessed portion to accommodate said plurality of batteries and a third portion serving as said keyboard, with the first, second and third portions being arranged in order in a longitudinal direction of said upper case;

a lower case secured to said upper case;

a printed circuit board interposed between said upper and lower cases and including a first region, a second region and a third region in vertical alignment with said first, second and third portions of said upper case, respectively, with the first region carrying thereon said timekeeping integrated circuit chip and said calculator integrated circuit chip, the second region being formed with bores for allowing replacement of said plurality of batteries therethrough and the third region being provided with a plurality of switch contacts;

a cell supporting frame disposed between the first recessed portion of said upper case and the first region of said printed circuit board;

a liquid crystal display cell supported by said cell supporting frame such that a display surface of said display cell is visible through the opening of said upper case;

elastic electrically conductive members disposed between the first region of said printed circuit board and said display cell to provide an electrical connection therebetween; and a plurality of keys provided in the third portion of said upper case and adapted to selectively close said plurality of switch contacts to produce said numeric and function signals.

2. The improvement according to claim 1, further comprising an acoustic device mounted on said printed circuit board at the first region thereof to provide an alarm sound in response to an output signal from said alarm time detection circuit, and in which said lower case has a plurality of openings at a position below said acoustic device to diffuse said alarm sound.

3. The improvement according to claim 2, in which said acoustic device includes a vibrating plate having formed thereon a piezoelectric vibrating element, with the vibrating plate being supported on a supporting plate secured to said printed circuit board, whereby vibrations produced by the acoustic device are amplified by the printed circuit board and said lower case is subjected to resonance to increase the level of said alarm sound.

4. The improvement according to claim 1, further comprising a lamp disposed below said liquid crystal display cell and supported by a lamp supporting platform mounted on said printed circuit board.

* * * * *